Patented Aug. 17, 1948

2,447,003

UNITED STATES PATENT OFFICE 2,447,003

PRODUCTION OF CARBON BISULFIDE

Bernard Wm. Gamson, Chicago, Ill., assignor to Great Lakes Carbon Corporation, Morton Grove, Ill., a corporation of Delaware No Drawing. Application July 24, 1944, Serial No. 546,427

7 Claims. (Cl. 23—206)

This invention relates to the production of improved and highly reactive carbon by essentially liquid phase dehydrogenation of hydrocarbonaceous materials in the presence of sulfur, and to the production therefrom of carbon bisulfide in relatively high and pure yields.

A "reactive" carbon may be defined as one which readily enters into chemical combination, the increasing reactivity thereof being characterized by both a relative lowering of reaction temperature requirement and a more and more complete reaction at lower and lower temperatures. Thus, for example, a coke resulting from petroleum pitch by thermal decomposition is not only obtained in low yield but shows no reactivity with sulfur at temperatures up to 1900° F. As distinguished from this, and in accordance with the present invention, substantially all of the theoretical amount of carbon may be recovered from such hydrocarbon and rendered 100% convertible to, for example, carbon bisulfide at a temperature of from about 1300 to about 1800° F.

In accordance with the present invention I have found that the reactivity of a carbon or carbonaceous residue produced from the hydrocarbon or hydrocarbonaceous material, and the yield thereof is largely proportional to the use and amount of sulfur employed in the dehydrogenation thereof, and which in turn is a direct function of the hydrogen content of the hydrocarbon. I have further found that the reactivity and ease of conversion, and the purity of the reaction product resulting from the employment of my "reactive" carbon is dependent upon the degree of dehydrogenation of the source hydrocarbon and the ultimate temperature employed, within limitations, for the dehydrogenation treatment.

In one specific embodiment the present invention relates to the production of a reactive carbon by subjecting a hydrocarbonaceous material to dehydrogenation by reacting it in essentially a liquid phase condition with sulfur in substantially stoichiometrical proportion to the hydrogen content of the hydrocarbon and at an initial temperature of from about 300° F. to about 500° F., then heating the reaction mixture to a temperature of from at least 1200° F. to about 1800° F., and preferably from about 1300° F. to about 1500° F., and recovering therefrom a carbonaceous residue containing about 1% of hydrogen based on the carbon content thereof.

In another specific embodiment the present invention relates to the production of carbon bisulfide in a two stage process which comprises subjecting a hydrocarbon to dehydrogenation by preferably reacting it in a liquid phase condition with sulfur and heating the reaction mixture to a temperature of at least about 1200° F., to form and eliminate a gaseous reaction mixture composed predominately of hydrogen sulfide, and thereafter subjecting the carbonaceous residue to reaction with vaporous sulfur at a temperature of from about 1300 to 1800° F., to form a reaction product composed essentially of carbon bisulfide.

In carrying out the process of my invention I initially subject a hydrocarbon or hydrocarbonaceous material to reaction with elemental sulfur at a relatively low temperature adequate to form a reaction mixture wherein the hydrocarbon is essentially converted to sulfurous compounds and thereafter raise the temperature of the reaction mixture to decompose the sulfurous compounds into hydrogen sulfide and carbon and to additionally distil off other remaining volatilizable components. The nature of the hydrocarbon, proportion of sulfur, conditions and temperature of the reaction are such as to result in maximum recovery of the theoretical carbon content of the hydrocarbon, maximum reactivity and convertibility of the resultant carbon or carbonaceous residue, minimum ash and volatile content of the carbonaceous residue, and particularly the substantially complete dehydrogenation of the treated hydrocarbon so as to avoid contamination of and enable the production of relatively pure reaction products by means of the resultant highly reactive carbon.

In order to carry out the initial processing step under most favorable conditions and to obtain a high degree of intimacy of the sulfur with the hydrocarbon with resultant maximum interaction and sulfur dehydrogenation, and to thereby yield a highly reactive carbon, and since it has been experimentally determined that appreciable reaction and dehydrogenation through hydrogen sulfide evolution takes place at about 350° F., I initially react the two in the liquid phase, at atmospheric or mildly superatmospheric pressure, and at a temperature of from about 300° F., to about 500° F. Under such conditions a reaction mixture is formed wherein the hydrocarbon reacts to form sulfurous compounds with an initial minimum of volatilization of the reactants and reaction products.

The carrying out of the initial portion of the process in the indicated liquid phase is to be distinguished from the initial introduction of either or both of the reactants in the vapor phase, or the reaction or sulfur with a solid carbonaceous material having a softening point over about 400° F., or one such as coal. In the latter instance it is impossible to obtain the desired degree of intimacy between molten sulfur and hydrocarbon solid to properly control the reaction and to effect sufficient dehydrogenation to give a fully reactive carbon, and additionally the resultant coked carbonaceous material includes an intolerably high proportion of undesirable ash and thermal carbon which is unreactive.

Therefore, for the purpose of this invention, I preferably employ hydrocarbonaceous materials which are normally liquid or heat liquefiable during the initial low temperature reaction period and which have boiling points in excess of about 350° F., at the operating pressure and softening points at or below about 400° F. The origin of the hydrocarbon is generally immaterial and it may be derived from coal, petroleum or other sources, and I may use virgin residues, cracked residuums, coal tar pitches, paraffin waxes and petroleum pitches. I prefer to employ relatively heavy hydrocarbons of an appreciable and preferably highly unsaturated character rather than paraffinic and saturated hydrocarbons since the former involve the use of less sulfur, and further the rate of reaction with sulfur is somewhat slower and the yield of reactive carbon somewhat less with the latter. The following are examples of hydrocarbons which may be advantageously employed in accordance with my invention, of both unsaturated and paraffinic character although, as indicated, with not fully equivalent results:

*Table*

|  | Coal Tar Pitch | Petroleum Pitch | Cracked Residuum |
|---|---|---|---|
| Softening point _____ ° F__ | 306 | 220 | [1] 75 |
| Hydrogen _____ percent__ | 4.25 | 8.64 | 9.01 |
| Sulfur _____ do__ | 0.54 | 1.74 | 1.14 |
| Ash _____ do__ | 0.13 | .021 | 0.13 |
| Coke residue (ASTM) _ do__ | 61.6 | 33.2 | 20.0 |
| Volatile Matter (ASTM)_do__ | 38.4 | 66.8 | 80.0 |

[1] Pour Point.

As previously indicated, the percentage of carbon yield and the degree of its reactivity is additionally dependent upon the use and proportion of sulfur employed for dehydrogenation, which in turn is to a considerable extent dependent on the hydrogen content of the hydrocarbon. Thus, theoretically, the sulfur should be admixed with the hydrocarbon in stoichiometrical proportion to the hydrogen to convert it to hydrogen sulfide, that is, each part by weight of hydrogen theoretically requires sixteen parts by weight of sulfur for conversion to hydrogen sulfide. I have found, however, that by employing at least about 60% of such stoichiometrical requirement that yields of at least about 85% of the theoretical amount of carbon and which is at least 95% convertible to carbon bisulfide may be obtained. With increasing proportions of sulfur it was found that higher yields of more reactive and more readily convertible carbon are obtained, and by employing substantially stoichiometrical proportions including a slight excess of sulfur, for example 110%, up to about 100% of the theoretical amount of carbon content may be recovered and which is so highly reactive that 100% thereof may be converted by for example reaction with added sulfur to form carbon bisulfide at temperatures as low as 1300° F.

Thus after admixing the hydrocarbon and the calculated proportioned amount of molten sulfur and reacting the mixture in a suitable reaction zone at a temperature of from about 300° to about 500° F., with suitable agitation, the reaction mixture is further gradually heated up to a temperature of from at least about 1200° F. to a maximum of about 1800° F., to decompose the sulfurous compounds formed into hydrogen sulfide and carbon, and to volatilize and distil off a gaseous mixture composed largely of hydrogen sulfide together with other materials such as other sulfur compounds and unreacted and volatile sulfur and hydrocarbon components. The resultant carbonaceous residue is a coke having a real density of from about 1.6 to about 1.8, an ash content of less than 1% and composed essentially of highly reactive carbon having about 1% and under favorable conditions such as maximum temperature and sulfur proportions, less than 0.5% of hydrogen by weight of the carbon.

The resultant coke composed essentially of highly reactive carbon is then eminently suitable for conversion to carbon bisulfite, among other things, by reacting it with a proportioned amount of vaporous sulfur, in either a batch process or a continuous process such as a fluidized system. Maximum reaction takes place at a relatively low temperature such as from about 1300° F. to about 1800° F. for ultimate recovery of the carbon as carbon bisulfide, although reaction commences at temperatures as low as about 1100° F., the initial and final reaction temperatures and rate of conversion being dependent on the proportion of sulfur employed in dehydrogenation of the hydrocarbon and the maximum temperature at which the carbon was calcined. Thus when lower proportions of sulfur, within the previously indicated useful range, are employed initial reaction takes place at 1500°–1600° F., with ultimate recovery of the carbon as carbon bisulfide at 1700°–1800° F., and when relatively higher proportions and up to the theoretical amount are employed, initial reaction takes place at 1100°–1200° F., with completion at about 1300°–1400° F.

Although I have indicated that a coked product formed in accordance with my invention is economically useful if its activity is such that somewhat less than 100% of the carbon is convertible to carbon bisulfide, this means that a small proportion of the material is inactive and incapable of reacting with sulfur, and for a batch process such material is not entirely desirable since it requires frequent cleaning of the reactor with the concomitant disadvantages that result from such operation. However, in a continuous process such as a fluidized system wherein the reactive coke is first finely divided and then passed upwardly with vaporous sulfur through a heated reactor, the mixture of gaseous sulfur and finely divided carbonaceous material acting as a fluid which obeys the hydrodynamic laws of fluid flow, and the mixture reacted in its upward passage to carbon bisulfide, and the reaction product passed thereafter through a device such as a Cottrell precipitator to separate unreacted or unreactive particle material, small proportions of unreactive carbon may be tolerated. I prefer, however, for both batch and continuous processes to use high and preferably substantially the theoretical amount of sulfur necessary to produce a coke wherein the carbon is substantially completely convertible to carbon bisulfide.

Further, in accordance with my invention it is not only important to be able to obtain a high recovery of the theoretical amount of carbon contained in the source hydrocarbon, and that a high percentage of or substantially all of the recovered carbon be reactive and convertible to carbon bisulfide, but as a characterizing feature of my invention it is important to be able to form a substantially pure and relatively uncontaminated reaction product by use of the reactive carbon, such as in the production of carbon bisulfide and to have it substantially free of hydrogen sulfide.

In order to accomplish this it is necessary that the dehydrogenation of the treated hydrocarbon be carried out to the extent that the resultant coke or active carbon contains about 1% and preferably less of hydrogen by weight of the carbon, since it is apparent that any remaining hydrogen in the coke upon treatment under conditions where carbon bisulfide forms will react to form hydrogen sulfide in admixture with carbon bisulfide. In addition to undue contamination if the percentage of hydrogen is too high, undue amounts of carbon bisulfide are carried away by the fixed hydrogen sulfide gas, and also a very serious loss of sulfur will occur unless the hydrogen sulfide formed is oxidized and the sulfur recycled. However, by producing and utilizing the highly reactive low hydrogen content carbon of my invention it may be effectively used for the production of carbon bisulfide, or other products.

The production of my characterizing substantially completed dehydrogenated highly reactive carbon is to a considerable degree dependent not only upon the proper proportions of reactants and their intimate association in the initial liquid phase reaction but the reaction temperature employed for dehydrogenation of the hydrocarbon to coke. In the initial liquid phase reaction step hydrogen sulfide already forms and as the temperature is elevated increasing amounts of hydrogen sulfide and other volatiles are distilled off, and at a temperature of 600–700° F., it may reach approximately 70% of the hydrogen in the hydrocarbon. However, at this point considerable of the original hydrogen content remains in the residue and increasing proportions thereof can only be removed by drastic increase in temperature. For example, in an otherwise generally comparative test run employing a hydrocarbon having an initial hydrogen content at 10.3% and where the reaction temperature was gradually carried up to 800° F., and terminated, the residual coke was found to still have a hydrogen content of 4.5% by weight based in the carbon and a high volatile content composed largely of volatilizable sulfur. It will be appreciated that such coke, even though reactive, if used for the production of carbon bisulfide will result in the production of a product highly contaminated with hydrogen sulfide, entail concomitant loss of carbon bisulfide in the fixed hydrogen sulphide gas upon condensation and purification of the carbon bisulfide, and additionally consume a considerable excessive amount of sulfur.

In order to remove the excessive residual hydrogen largely in the form of hydrogen sulfide it is necessary to elevate the reaction or finishing temperature, as previously indicated, to at least about 1200° F., but not greater than about 1800° F., and preferably within the range of 1300 to 1500° F., to insure elimination to about 1% and preferably have less than 0.5% of hydrogen, although under such reaction conditions the evolved gases will include in small amounts other volatilizable components in addition to hydrogen sulfide.

In order to accelerate the initial liquid phase reaction between the hydrocarbon and the molten sulfur, that is to enable the reaction between the two to be brought about more completely, and more rapidly at the relatively lower portion of the indicated temperature range, I may employ an agent of the type conventionally employed in the acceleration of sulfur vulcanization of rubber, such as benzothiazole derivatives, thiuram sulfides, salts of dithio acids, guanidine derivatives, aldehyde amines, and so forth.

The highly reactive carbon produced in accordance with my invention, in addition to being useful for the production of carbon bisulfide as hereinbefore set forth, is suitable for use in the production and enhancement of the conditions of formation of products such as calcium carbide; ferro alloys such as ferro-tungsten, ferro-molybdenum, ferro-vanadium, ferro-manganese, etc.; silicon carbide; boron carbide; aluminum oxide from bauxite, sodium cyanide; halogenated carbon compounds; phosphorous and phosphoric acid; activated carbon; and as a catalyst, e. g., in processing of hydrocarbons.

The following examples are further illustrative of several runs employing the hydrocarbons set forth in the table, in accordance with my invention, but are not to be considered in limitation thereof.

*Example I*

A charge of the petroleum pitch described in the table was intimately admixed with 148 parts by weight of molten sulfur, equivalent to 107 mol percent of the $H_2$ content of the hydrocarbon. The mixture was first heated to a temperature of about 350° F., to largely convert the hydrocarbon to sulfurous compounds, and the resulting reaction mixture was then gradually heated up in a coking kiln to a temperature of 1400° F. to decompose the sulfurous compounds formed into hydrogen sulfide and carbon, and to additionally distil off other concomitant and remaining volatilizable components. The coked residue recovered had a real density of 1.67 and the carbon yield thereof was 91.2% of theoretical. Analysis showed the coke to have a content of 10.2% volatile matter, 13.3% sulfur and 0.98% ash. The hydrogen content was 0.95%, or 1.2% by weight based on the carbon.

The carbonaceous residue thus obtained was then reacted with vaporous sulfur to form carbon bisulfide, reaction between the coke and sulfur being initiated at the low temperature of 1200° F. with completion to ultimate recovery of the coked carbon as carbon bisulfide at a temperature of 1400° F., the coked carbon being quantitively converted to carbon bisulfide.

*Example II*

A charge of the same petroleum pitch as in the foregoing example was admixed and initially reacted with 100 parts by weight of sulfur equivalent to 72.5 mol. percent of the $H_2$ content of the hydrocarbon. The initial reaction mixture was then gradually heated to a temperature of 1550° F. and the resultant coked residue recovered. This coke had a density of 1.76 and a hydrogen content of 0.7%, or 0.8% by weight of the carbon. The yield of carbon was 84% of theoretical.

Upon reaction of this carbonaceous residue with sulfur to form carbon bisulfide, the reaction was initiated at a temperature of 1300° F. with maximum conversion taking place at a temperature of 1600° F., ultimate recovery of coked carbon as carbon bisulfide being 100%.

Example III

A charge of the cracked residuum of the table was admixed with 154 parts by weight of sulfur, equivalent to 107 mol. percent of the $H_2$ content thereof and initially reacted at a temperature of about 300° F., and the reaction mixture then gradually heated up to a temperature of 1400° F. and the carbonaceous residue recovered. The carbon yield thereof was found to be 85.8% of the theoretical. Analysis showed the coke to have a content of 13.5% volatile matter, 16.4% sulfur and 1.24% ash. The hydrogen content was 0.95% by weight of the carbon.

Upon reaction of this coked residue with sulfur to form carbon bisulfide the reaction initiated at a temperature of 1200° F., going to completion at 1400° F. with 100% ultimate recovery of the carbon content as carbon bisulfide.

Example IV

A charge of the coal tar pitch of the table was admixed with 77 parts by weight of sulfur, equivalent to 113 mol. percent of the $H_2$ content of the hydrocarbon, initially reacted at a temperature of about 400° F., and then gradually heated up to a coking temperature of 1400° F., and the coked residue recovered. The carbon yield was found to be 100% of theoretical. The coke contained 9.8% volatile matter, 17.0% sulfur, 0.45% ash, and had a hydrogen content of 1.0% by weight of the carbon.

Upon reaction of this coked residue with sulfur to form carbon bisulfide, reaction started at 1200° F. with completion to 100% ultimate recovery of the carbon as carbon bisulfide at 1400° F.

I claim as my invention:

1. In a process for manufacturing carbon disulfide by contacting vaporous sulfur and a carbonaceous substance at a temperature in the range of about 1100 to about 1800° F., the improvement including the steps of contacting said sulfur with an infusible solid comprising a major part of carbon with relatively minor parts of sulfur and hydrogen, the carbon being at least about 95% convertible to carbon disulfide, said solid being produced by initially preparing a substantially uniform mixture of a hydrocarbonaceous substance with elemental sulfur in proportions of at least 60% of the stoichiometric equivalent of the hydrogen content of said substance, and calcining the mixture at a temperature of 1200°–1800° F., thereby eliminating the major portion of the hydrogen as hydrogen sulfide, the sulfur in said solid being a substantial portion of the sulfur originally added and not volatilizable on long heating at the temperature of the last mentioned heating step.

2. The process of claim 1 wherein the hydrocarbonaceous substance is heat fusible.

3. The process of claim 1 wherein the hydrocarbonaceous substance is heat fusible, has a boiling point of above about 350° F. and is of petroleum origin.

4. The process of claim 1 wherein the hydrocarbonaceous substance is of petroleum origin and liquefiable in the range of about 300 to about 500° F.

5. In a process for manufacturing carbon disulfide by contacting vaporous sulfur and a carbonaceous substance at a temperature in the range of about 1100° to about 1800° F., the improvement comprising contacting said sulfur with an infusible solid containing a major part of carbon, and relatively minor amounts of sulfur and hydrogen, produced by initially preparing at a temperature of about 300 to about 500° F., a substantially uniform mixture of a liquefiable hydrocarbon, with elemental sulfur in the proportions of at least 60% of the stoichiometric equivalent of the hydrogen content of the said hydrocarbon and heating the mixture to a temperature about 1200°–1800° F., thereby eliminating the major portion of the hydrogen as hydrogen sulfide, the sulfur in said solid being a substantial portion of the sulfur originally added and not volatilizable on long heating at the temperature of the last mentioned heating step.

6. A process for manufacturing carbon disulfide which comprises initially preparing a substantially uniform mixture of a hydrocarbonaceous substance with elemental sulfur in proportions of at least 60% the stoichiometric equivalent of said hydrogen in said substance, calcining the mixture at a temperature of 1200°–1800° F., thereby eliminating the major portion of the hydrogen as hydrogen sulfide, and then contacting additional sulfur vapors with the solid, infusible carbon-sulfur-hydrogen substance thus formed, at a temperature in the range of about 1100°–1800° F. until at least about 95% of the carbon content thereof is converted to carbon disulfide.

7. In a process for manufacturing carbon disulfide by contacting vaporous sulfur and a carbonaceous substance at a temperature in the range of about 1100 to about 1800° F., the improvement including the steps of contacting said sulfur with an infusible solid comprising a major part of carbon with relatively minor parts of sulfur and hydrogen, the carbon being at least about 95% convertible to carbon disulfide, said solid being produced by initially preparing a substantially uniform liquid mixture of a heavy hydrocarbon, liquid in the range of about 300–500° F. boiling above about 350° F. and melting below about 400° F., with elemental sulfur in proportions approximately the stoichiometric equivalent of the hydrogen content of said hydrocarbon, and heating the mixture at a temperature of about 1200–1800° F. thereby eliminating the major portion of the hydrogen as hydrogen sulfide, said sulfur in said solid being a substantial portion of the sulfur originally added and not volatilizable on long heating at the temperature of the last mentioned heating step.

BERNARD WM. GAMSON.

REFERENCES CITED

The following references are of record in the file of this patent:

UNITED STATES PATENTS

| Number | Name | Date |
| --- | --- | --- |
| 1,565,894 | Bindschedler | Dec. 15, 1925 |
| 1,650,126 | Hall | Nov. 22, 1927 |
| 1,981,161 | Bodenstein | Nov. 20, 1934 |
| 2,026,840 | Leahy | Jan. 7, 1936 |
| 2,177,226 | Rice et al. | Oct. 24, 1939 |
| 2,234,769 | McCulloch | Mar. 11, 1941 |

Certificate of Correction

Patent No. 2,447,003.

August 17, 1948.

BERNARD W. GAMSON

It is hereby certified that errors appear in the printed specification of the above numbered patent requiring correction as follows:

Column 3, in the table, under the heading "Petroleum Pitch", fourth line, for the numeral ".021" read *0.21*; same table, under the heading "Cracked Residuum", line 1, for "¹ 75" read ¹ *85*;

and that the said Letters Patent should be read with these corrections therein that the same may conform to the record of the case in the Patent Office.

Signed and sealed this 10th day of May, A. D. 1949.

[SEAL]

THOMAS F. MURPHY,
*Assistant Commissioner of Patents.*